United States Patent [19]
Orzel

[11] Patent Number: 5,357,751
[45] Date of Patent: Oct. 25, 1994

[54] AIR/FUEL CONTROL SYSTEM PROVIDING CATALYTIC MONITORING

[75] Inventor: Daniel V. Orzel, Westland, Mich.

[73] Assignee: Ford Motor Company, Dearborn, Mich.

[21] Appl. No.: 43,713

[22] Filed: Apr. 8, 1993

[51] Int. Cl.⁵ .............................. F01N 3/20
[52] U.S. Cl. .......................... 60/274; 60/276; 60/277; 123/691
[58] Field of Search ............ 60/274, 276, 277; 123/691

[56] References Cited

U.S. PATENT DOCUMENTS

| | | |
|---|---|---|
| 3,939,654 | 2/1976 | Creps . |
| 4,130,095 | 12/1978 | Bowler et al. . |
| 4,304,204 | 12/1981 | Glöckler et al. . |
| 4,526,147 | 7/1985 | Grob . |
| 4,831,838 | 5/1989 | Nagai et al. . |
| 5,077,970 | 1/1992 | Hamburg ................ 60/277 |
| 5,115,639 | 5/1992 | Gopp ..................... 60/274 |
| 5,157,919 | 10/1992 | Gopp ..................... 60/277 |
| 5,207,056 | 5/1993 | Benninger . |
| 5,224,345 | 7/1993 | Schnaibel et al. . |
| 5,251,437 | 10/1993 | Furuya . |
| 5,255,512 | 10/1993 | Hamburg et al. . |
| 5,255,515 | 10/1993 | Blumenstock et al. . |
| 5,289,678 | 3/1994 | Grutter .................. 60/277 |

Primary Examiner—Douglas Hart
Attorney, Agent, or Firm—Allan J. Lippa; Roger L. May

[57] ABSTRACT

A control system which provides a measurement of efficiency in a catalytic converter coupled to the engine exhaust. For each inducted airflow range in which the engine is operating, test periods are generated by counting transitions in the output of an upstream exhaust gas oxygen sensor. These test periods are limited to a maximum count. Concurrently, during each test period, transitions are counted in a downstream exhaust gas oxygen sensor. Upstream and downstream transitions are accumulated and a ratio of the accumulated totals determines converter efficiency.

10 Claims, 5 Drawing Sheets

5,357,751

AIR/FUEL CONTROL SYSTEM PROVIDING CATALYTIC MONITORING

FIELD OF THE INVENTION

The invention relates to air/fuel control systems responsive to both upstream and downstream exhaust gas oxygen sensors, the control system also providing monitoring of the catalytic converter's efficiency.

BACKGROUND OF THE INVENTION

It is known to use exhaust gas oxygen sensors positioned both upstream and downstream of a catalytic converter to provide air/fuel control of the engine. An example of such usage is found in U.S. Pat. No. 5,115,639.

Various approaches are also known to use the outputs of the upstream and downstream exhaust gas oxygen sensors to provide an indication of catalytic converter efficiency. In one such system, an increase in the amplitude output of the downstream sensor as compared to the upstream sensor provides an indication of converter degradation. In another type of system, the switching frequency of the sensor outputs are compared during steady-state engine operations under a particular combination of engine speed and load.

The inventor herein has recognized numerous problems with the above approaches. For example, amplitude comparison has been found to suffer because exhaust gases from each of the combustion chambers may not be fully mixed in the exhaust manifold. Consequently, there may be variations in sensor amplitude which are caused by lack of exhaust gas mixing and not caused by catalytic degradation. With respect to those systems examining sensor switching frequencies, the inventor herein has discovered at least two significant problems. If the air/fuel feedback loop is in a transient state during the test such that combustion is on average either rich or lean of stoichiometry, there may be insufficient switching of the sensors to provide any reasonable indication of converter efficiency. Further, such systems do not examine converter efficiency over the full range of possible exhaust gas flow rates. Accordingly, inaccurate indications of converter efficiency may result.

SUMMARY OF THE INVENTION

An object of the invention herein is to provide monitoring of catalytic converter efficiency over a broad range of exhaust gas flow rates with greater accuracy than heretofore possible and to provide such monitoring while maintaining engine air/fuel operation at stoichiometry.

The above object is achieved, and problems of prior approaches overcome, by providing both a control system and method for indicating efficiency of a catalytic converter positioned in the engine exhaust. In one particular aspect of the invention, the control system comprises the steps of: indicating transitions from a first state to a second state in an output of an exhaust gas oxygen sensor positioned upstream of the converter; separately counting the upstream sensor transitions during engine operation in each of a plurality of inducted airflow ranges and limiting each of the separate upstream sensor counts to one of a corresponding plurality of preselected maximum values for each of the airflow ranges; generating a separate test period for each of the airflow ranges when the separate upstream sensor count reaches the corresponding maximum value; counting transitions from a first state to a second state in an output of an exhaust gas oxygen sensor positioned downstream of the converter during each of the separate test periods; calculating a ratio between the downstream sensor count to a total of all of the upstream sensor counts when the engine has completed operation in all of the airflow ranges for at least the test period corresponding to each of the airflow ranges; and indicating degraded converter efficiency when the calculated ratio exceeds a predetermined ratio.

Preferably, the method includes the steps of controlling fuel delivered to the engine in response to a feedback variable derived from said upstream sensor output and trimming the feedback variable in response to a trim signal derived from the downstream sensor output.

An advantage of the above aspect of the invention is that the predetermined test periods assure testing of the catalytic converter under the full range of exhaust gas flows. Further, by defining the test periods to be of equal duration (i.e., number of upstream sensor transitions), testing of the catalytic converter is not skewed when engine operation occurs predominately within one or a few airflow ranges during a test cycle. Stated another way, an advantage is obtained of more accurately determining converter efficiency than heretofore possible. Still another advantage, is that by appropriately weighing the test periods, a more accurate indication of converter efficiency is provided. For example, any degradation in converter efficiency is most likely to become apparent at higher exhaust gas flows. Accordingly, providing longer test periods (i.e., a greater number of upstream transitions) at high inducted airflows, will more accurately determine converter efficiency than if the test periods were of the same duration or totally random.

Still another advantage of the above aspect of the invention, is that converter efficiency is monitored while engine air/fuel operation is maintained at stoichiometry.

BRIEF DESCRIPTION OF THE DRAWINGS

The object and advantages of the invention described above will be more clearly understood by reading an example of an embodiment in which the invention is used to advantage with reference to the attached drawings wherein.

DESCRIPTION OF AN EMBODIMENT

Figure 1:
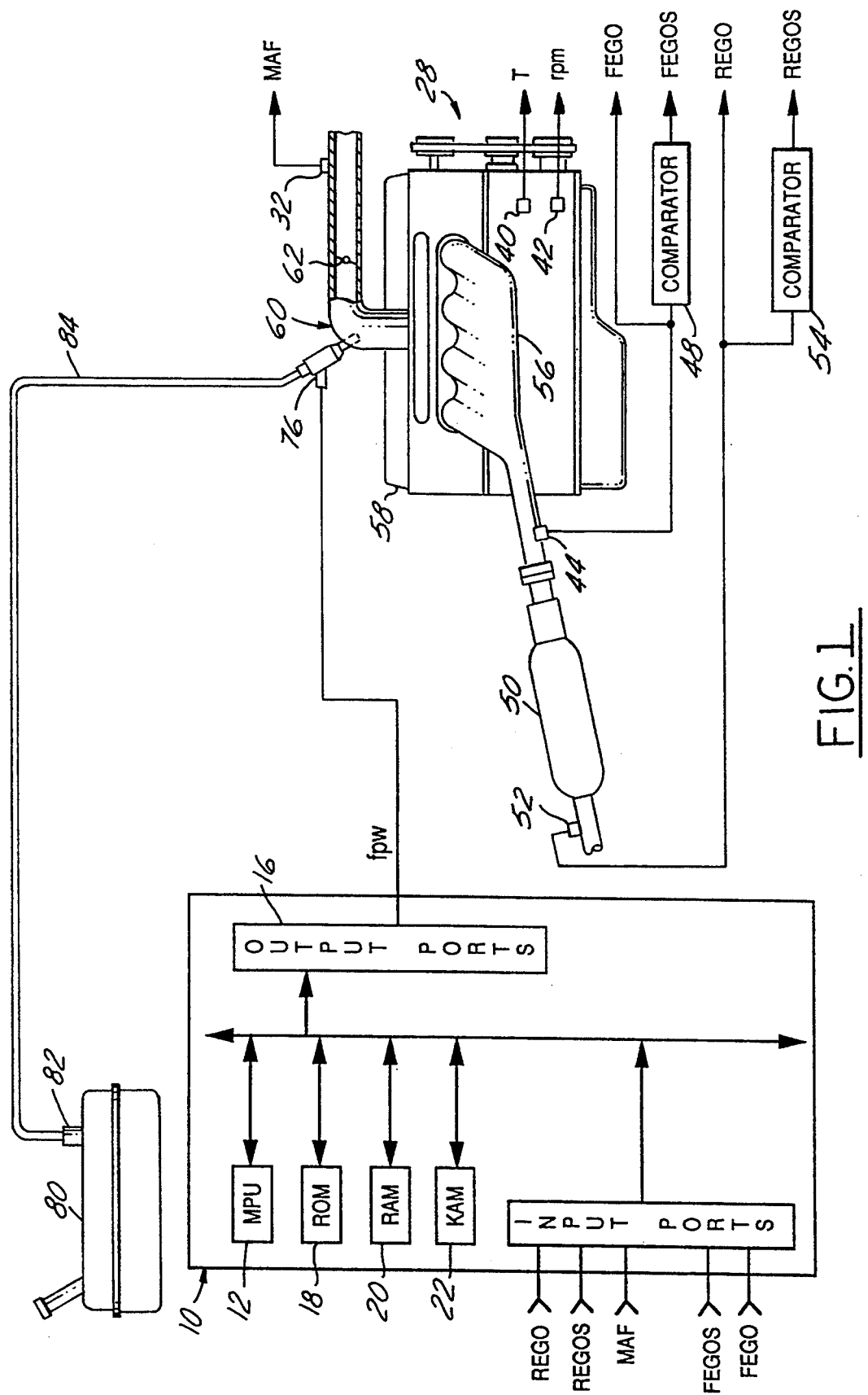
FIG. 1 is a block diagram of an embodiment where the invention is used to advantage.

Controller 10 is shown in the block diagram of FIG. 1 as a conventional microcomputer including: microprocessor unit 12; input ports 14; output ports 16; read-only memory 18, for storing the control program; random access memory 20 for temporary data storage which may also be used for counters or timers; keep-alive memory 22, for storing learned values; and a conventional data bus.

Controller 10 is shown receiving various signals from sensors coupled to engine 28 including: measurement of inducted mass airflow (MAF) from mass airflow sensor 32; engine coolant temperature (T) from temperature sensor 40; and indication of engine speed (rpm) from tachometer 42.

Output signal FEGO from conventional exhaust gas oxygen sensor 44, positioned upstream of catalytic converter 50, is compared to a reference value associated with stoichiometry in comparator 48 for providing output signal FEGOS. Signal FEGOS is a two-state signal which is a predetermined high voltage when exhaust gases are rich of stoichiometry and a predetermined low voltage when exhaust gases are lean of stoichiometry. Both signal FEGO and signal FEGOS are both coupled to controller 10.

Another conventional exhaust gas oxygen sensor (50) is shown coupled to exhaust manifold 56 downstream of catalytic converter 52 and provides signal REGO to controller 10 which is related to oxygen content in the exhaust gases. Output signal REGO is also compared to a reference value associated with stoichiometry in comparator 54 for providing two-state output signal REGOS to controller 10. Signal REGOS is preselected high voltage when exhaust gases downstream of catalytic converter 50 are rich of stoichiometry and a low preselected voltage when such exhaust gases are lean of stoichiometry.

Continuing with FIG. 1, intake manifold 58 of engine 28 is shown coupled to throttle body 60 having primary throttle plate 62 positioned therein. Throttle body 60 is also shown having fuel injector 76 coupled thereto for delivering liquid fuel in proportion to the pulse width of signal fpw from controller 10. Fuel is delivered to fuel injector 76 by a conventional fuel system including fuel tank 80, fuel pump 82, and fuel rail 84.

Figure 2:
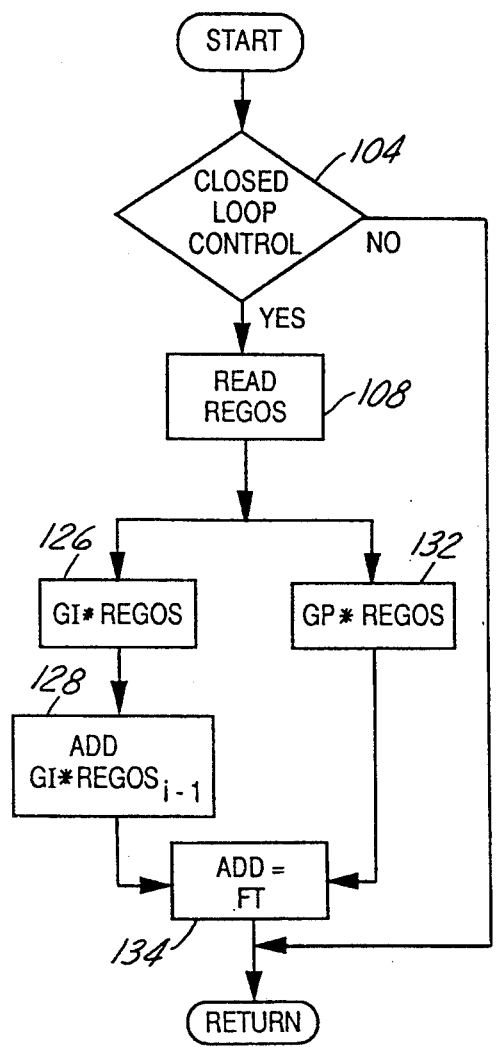
FIG. 2 is a high level flowchart of various operations performed by a portion of the embodiment shown in FIG. 1.

Referring now to FIG. 2, a flowchart of a routine performed by controller 10 to generate fuel trim signal FT is now described. A determination is first made whether closed-loop air/fuel control is to be commenced (step 104) by monitoring engine operation conditions such as temperature. When closed-loop control commences, signal REGOS is read from comparator 54 (step 108) and subsequently processed in a proportional plus integral controller as described below.

Referring first to step 126, signal REGOS is multiplied by gain constant GI and the resulting product added to products previously accumulated (GI*REGOS$_{i-1}$) in step 128. Stated another way, signal REGOS is integrated each sample period (i) in steps determined by gain constant GI. During step 132, signal REGOS is also multiplied by proportional gain GP. The integral value from step 128 is added to the proportional value from step 132 during addition step 134 to generate fuel trim signal FT.

Figure 3:
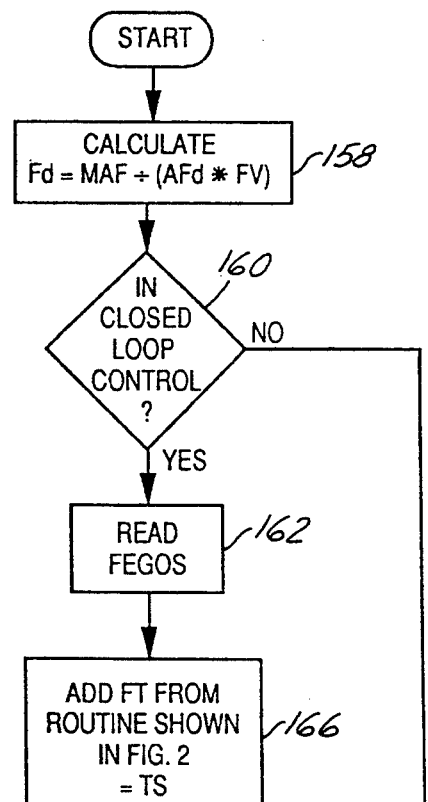
FIG. 3 is a high level flowchart of various operations performed by a portion of the embodiment shown in FIG. 1.
Figure 3:
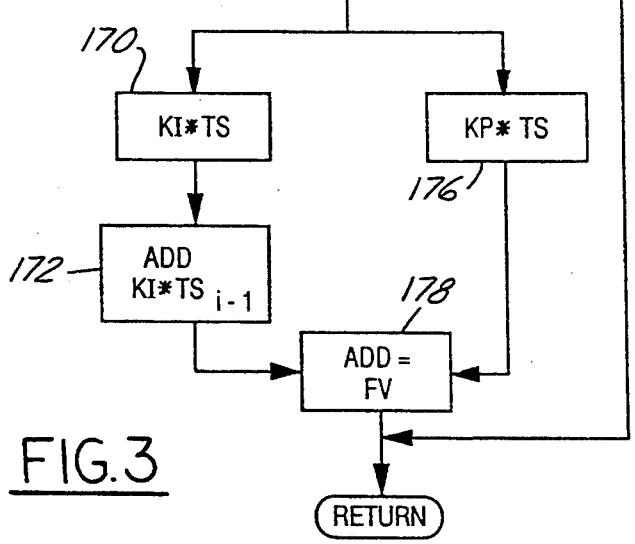

The routine executed by controller 10 to generate the desired quantity of liquid fuel delivered to engine 28 and trimming this desired fuel quantity by a feedback variable related both to sensor 44 and fuel trim signal FT is now described with reference to FIG. 3. During step 158, an open-loop fuel quantity is first determined by dividing measurement of inducted mass airflow (MAF) by desired air/fuel ratio AFd which is typically the stoichiometric value for gasoline combustion. This open-loop fuel charge is then adjusted, in this example divided, by feedback variable FV.

After determining that closed-loop control is desired (step 160) by monitoring engine operating conditions such as temperature (T), signal FEGOS is read during step 162. During step 166, fuel trim signal FT is transferred from the routine previously described with reference to FIG. 2 and added to signal FEGOS to generate trimmed signal TS.

During steps 170–178, a conventional proportional plus integral feedback routine is executed with trimmed signal TS as the input. Trimmed signal TS is first multiplied by integral gain value KI (step 170), and the resulting product added to the previously accumulated products (step 172). That is, trimmed signal TS is integrated in steps determined by gain constant KI each sample period (i) during step 172. A product of proportional gain KP times trimmed signal TS (step 176) is then added to the integration of KI*TS during step 178 to generate feedback variable FV.

Figure 4A:
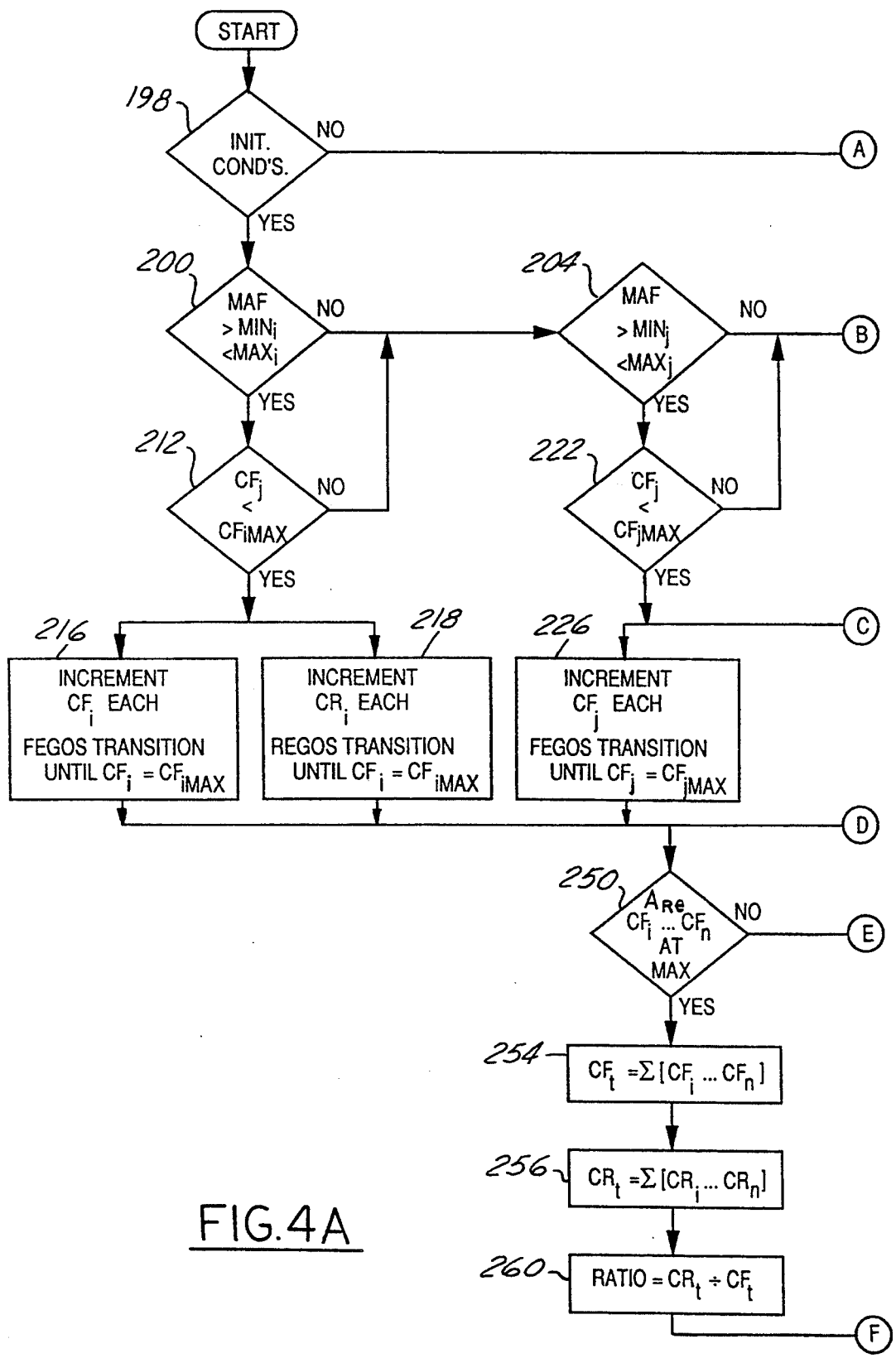
FIGS. 4A and 4B is a high level flowchart of various operations performed by a portion of the embodiment shown in FIG. 1.
Figure 4B:
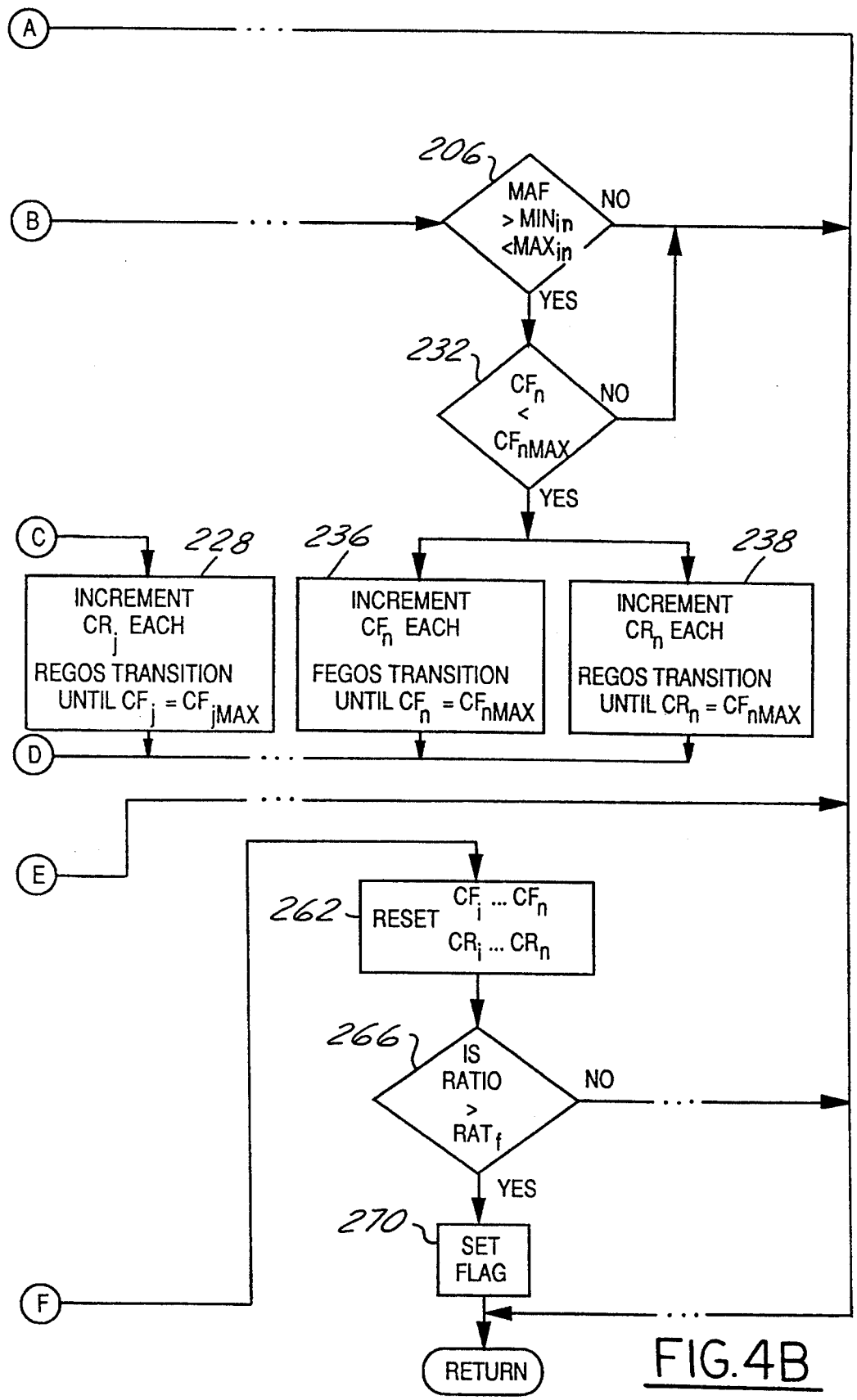

An example of testing converter efficiency is now described with particular reference to the flowchart shown in FIGS. 4A and 4B. During step 198, initial engine conditions are checked before entering the test cycle described below. More specifically, engine temperature (T) should be within a predetermined range, a predetermined time should have elapsed since the engine was started, and the closed-loop air/fuel control should have been operable for preselected time.

During steps 200, 204, and 206, the inducted airflow range in which engine 28 is operating is determined. These ranges are described as range (i), range (j) ..., range (n) for this example wherein "n" inducted airflow ranges are used to advantage.

Assuming engine operation is within airflow range (i), transitions between states of signal FEGOS are counted to generate count signal $CF_i$. This count is compared to maximum count $CF_{max}$ during step 212. While engine operation remains within airflow range (i), a test period of predetermined duration is generated by incrementing count $CF_i$ each transition of signal FEGOS until count $CF_i$ is equal to maximum count $CF_{max}$ (step 216). During this test period (i), count $CR_i$ is incremented each transition of signal REGOS (step 218). Stated another way, count $CR_i$ is incremented each transition of signal REGOS until count $CF_i = CF_{max}$.

When engine operation is within airflow range (j) as shown in step 204, predetermined period (j), count $CF_j$, and count $CR_j$ are determined in steps 222, 226, and 228 in a manner similar to that described above for airflow range (i) with respect to steps 212, 216, and 218. Each transition in signal FEGOS, count $CF_j$ is incremented until it reaches maximum count $CF_{jmax}$ (step 222). Predetermined test period (j) is thereby defined. During test period (j), count $CR_j$ is increment each transition of signal REGOS (step 228).

The above described operation occurs for each airflow range. For example, when engine 28 is operating within airflow range (n) as shown in step 206, test period (n), count $CF_n$, and count $CR_n$ are generated as shown in steps 232, 236, and 238.

During step 250, a determination is made as to whether engine 28 has operated in all airflow ranges (i ... n) for the respective test periods (i ... n). Stated another way, step 250 determines when each count of transitions in signal FEGOS ($CF_i$, $CF_j$, ... $CF_n$) have reached their respective maximum values ($CF_{imax}$, $CF_{jmax}, \ldots CF_{nmax}$).

Each count ($CF_i \ldots CF_n$) of transitions in signal FEGOS for respective test periods (i ... n) are summed in step 254 to generate total count $CF_t$. For reasons described above, the same total count $CF_t$ may be obtained by summing each maximum count ($CF_{imax} \ldots CF_{nmax}$) for respective test periods (i ... n).

Total count $CR_t$ is generated in step 256 by summing each count ($CR_i \ldots CR_n$) for respective test periods (i ... n). A ratio of total count $CR_t$ to total count $CF_t$ is then calculated during step 260 and all counts subsequently reset in step 262. If the calculated ratio is greater than a preselected reference ratio ($RAT_f$) a flag is set (steps 266 and 270) indicating that converter efficiency has degraded below a preselected limit.

Figure 5:
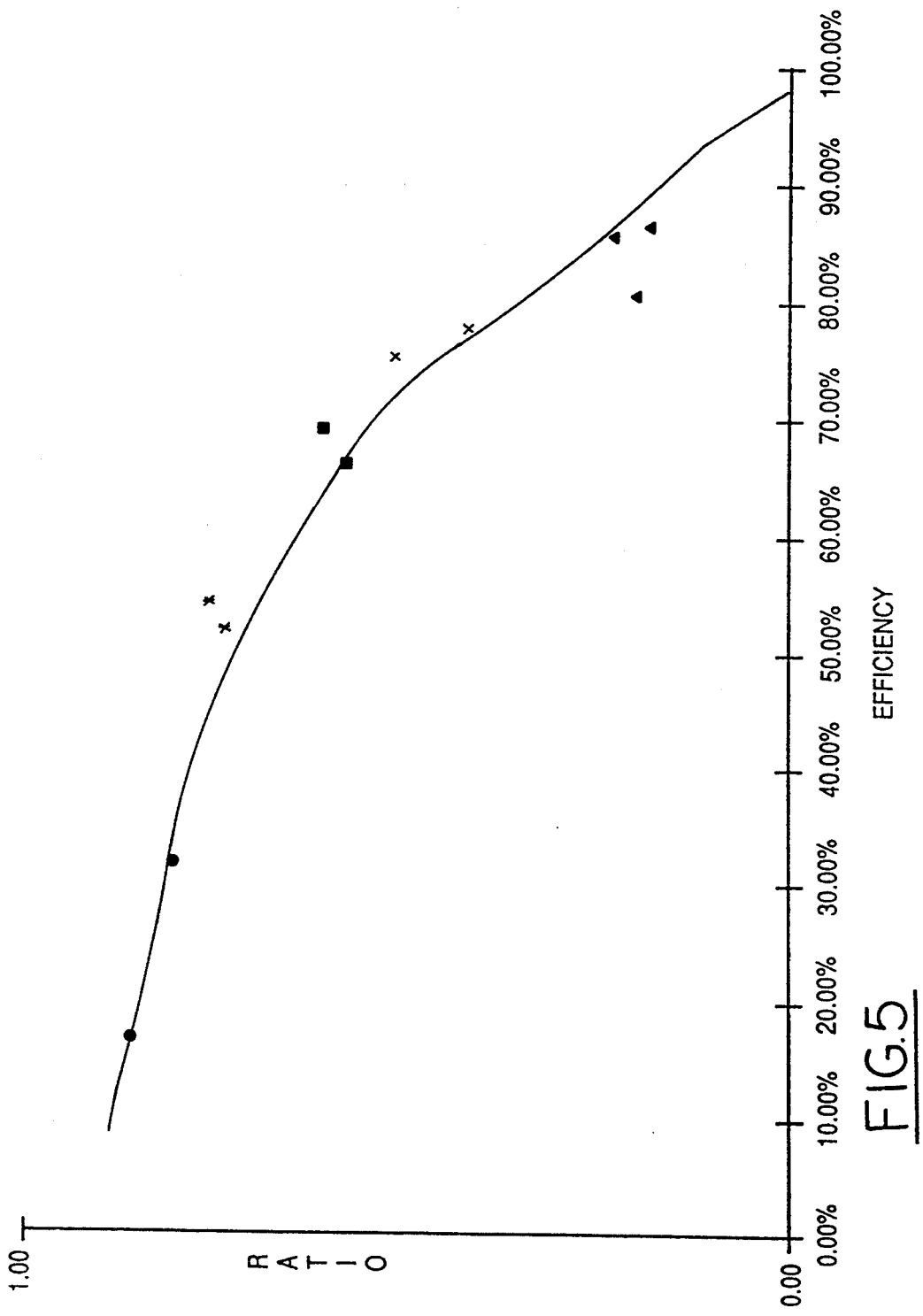
FIG. 5 is graphical representation of converter efficiency.

The actual ratio calculated in step 266 may also be used to provide a measurement of converter efficiency. Due to the advantages described previously herein, this indication of converter efficiency is accurate over a wider range of converter efficiencies than heretofore possible as is apparent upon reviewing the graph of ratios to converter efficiencies shown in FIG. 5.

An example of operation has been presented wherein both upstream sensor 44 and downstream sensor 52 are two-state exhaust gas oxygen sensors. The invention claimed herein, however, may be used to advantage with other sensors such as proportional sensors. Other modifications will become apparent to those skilled in the art without departing from the spirit and scope of the invention claimed herein. Accordingly, the inventor herein intends that the invention be defined only by the following claims.

What is claimed

1. A method for indicating efficiency of a catalytic converter positioned in the engine exhaust, comprising the steps of:
   providing a converter test cycle by determining when the engine has completed operation within each of a plurality of inducted airflow ranges for at least a minimum duration in each of said airflow ranges;
   generating each of said minimum durations by determining when a preselected number of transitions from a first state to a second state has occurred in an exhaust gas oxygen sensor positioned upstream of the converter while the engine is operating in one of said airflow ranges; and
   indicating degraded converter efficiency during said test cycle by calculating a ratio between said transitions in said upstream exhaust gas oxygen sensor to transitions in a downstream exhaust gas oxygen sensor positioned downstream of the converter.

2. The method recited in claim 1 wherein said transitions in said upstream sensor and said downstream sensor are generated by comparing each sensor output to a reference.

3. The method recited in claim 1 wherein said ratio generated in said indicating step is compared to a preselected ratio to provide an indication of converter failure.

4. A method for indicating efficiency of a catalytic converter positioned in the engine exhaust, comprising the steps of:
   indicating transitions from a first state to a second state in an output of an exhaust gas oxygen sensor positioned upstream of the converter;
   separately counting said upstream sensor transitions during engine operation in each of a plurality of inducted airflow ranges and limiting each of said separate upstream sensor counts to one of a corresponding plurality of preselected maximum values for each of said airflow ranges;
   generating a separate test period for each of said airflow ranges when said separate upstream sensor count reaches said corresponding maximum value;
   counting transitions from a first state to a second state in an output of an exhaust gas oxygen sensor positioned downstream of the converter during each of said separate test periods;
   calculating a ratio between said downstream sensor count to a total of all of said upstream sensor counts when the engine has completed operation in all of said airflow ranges for at least said test period corresponding to each of said airflow ranges; and
   indicating degraded converter efficiency when said calculated ratio exceeds a predetermined ratio.

5. The method recited in claim 4 further comprising the step of controlling fuel delivered to the engine in response to a feedback variable derived from said upstream sensor output.

6. The method recited in claim 5 wherein said controlling step further comprises a step of integrating said upstream sensor output to generate said feedback variable.

7. The method recited in claim 5 wherein said downstream sensor output is integrated to generate a trim signal for trimming said feedback variable.

8. A system for indicating efficiency of a catalytic converter positioned in the engine exhaust, comprising:
   control means for controlling fuel delivered to the engine in response to a feedback variable derived from an output of an exhaust gas oxygen sensor positioned upstream of the converter;
   test means for indicating completion of a converter test when the engine has completed operation within each of a plurality of inducted airflow ranges for at least a predetermined duration in each of said airflow ranges, said test means generating each of said predetermined durations when a preselected number of transitions in said upstream sensor output from a first state to a second state has occurred;
   summing means operating in response to said completion of converter test indication for summing said preselected number of said upstream sensor transitions and for summing transitions in a downstream exhaust gas oxygen sensor positioned downstream of the converter during each of said predetermined durations; and
   indicator means for calculating a ratio between said summed transitions in said upstream sensor to said summed transitions in said downstream sensor to determine converter efficiency.

9. The system recited in claim 8 wherein said control means further includes trim means for trimming said feedback variable in response to an integration of said downstream sensor output.

10. The system recited in claim 8 wherein said test means determines operation within a particular airflow range by comparing inducted airflow to a preselected minimum value and a preselected maximum value so that converter efficiency is determined over a range of exhaust gas flows.

* * * * *